United States Patent [19]
Parker

[11] Patent Number: 5,697,240
[45] Date of Patent: Dec. 16, 1997

[54] METHOD OF DETERMINING THE BEND IN A SECTION OF PIPE

[75] Inventor: William David Parker, Tulsa, Okla.

[73] Assignee: Sabre International, Inc., Tulsa, Okla.

[21] Appl. No.: 727,048

[22] Filed: Oct. 8, 1996

[51] Int. Cl.⁶ ........................................ B21C 51/00
[52] U.S. Cl. ...................... 72/31.05; 72/389.7; 72/369
[58] Field of Search ........................ 72/16.2, 17.3, 72/387, 369, 389.1, 389.7, 31.04, 31.05, 31.1, 31.12

[56] References Cited

U.S. PATENT DOCUMENTS

| | | | |
|---|---|---|---|
| 4,131,003 | 12/1978 | Foster et al. | 72/31.1 |
| 4,649,726 | 3/1987 | Trammell et al. | 72/34 |
| 4,912,957 | 4/1990 | Peterson et al. | 72/17.3 |
| 5,222,384 | 6/1993 | Evans | 72/31.05 |
| 5,239,850 | 8/1993 | Shimokata | 72/17.3 |
| 5,305,223 | 4/1994 | Saegusa | 72/31.05 |

Primary Examiner—Lowell A. Larson
Assistant Examiner—Ed Tolan
Attorney, Agent, or Firm—Scott R. Zingerman; Frank J. Catalano

[57] ABSTRACT

A system for determining the bend in a section of pipe which is being bent by a bending machine which includes a stiffback and a pinup shoe. The pipe to be bent is placed in the stiffback and extends out the end at the pinup shoe and its angle $S_i$ is obtained of the pipe with respect to the horizontal. An outboard and an inboard cylinder force the pipe and the stiffback against a die to obtain a bend. This system is especially good for determining the angle of bend when the bending machine is on a non-level surface. After such bending, the angle of the pipe $S_h$ at the pinup shoe with respect to the horizon is made, and then subtracting $S_i$ from $S_n$ to obtain the angle of bend of the pipe. In another embodiment the angle detector is calibrated to read zero when the angle detector is measuring the actual angle the pipe makes with the horizontal before the pipe is bent.

10 Claims, 4 Drawing Sheets

METHOD OF DETERMINING THE BEND IN A SECTION OF PIPE

BACKGROUND OF THE INVENTION

1. Field of the Invention

The field of invention relates to an apparatus and a method for determining the bend in a pipe which is bent in a pipe bender.

More particularly, the present invention relates to a system in which the pipe is bent by the pipe bending machine and is especially useful on non-level surfaces.

2. Prior Art

A special bending machine is used to bend large diameter pipe. This includes a frame, a stiffback, a die, and a pinup shoe. The stiffback is essentially a semi-circular trough for receiving pipe. It is supported from a frame by an outboard cylinder and an inboard cylinder. The cradle or pinup shoe is also activated by an hydraulic cylinder. The die is supported from the frame above the stiffback.

The pipe to be bent is placed in the machine and is supported at one end by the stiffback and by the pinup shoe on the other end. The pipe to be bent is then wedged against the bottom of the die by the outboard cylinder, the inboard cylinder, and the pinup shoe. Then additional force is applied through the outboard cylinder and inboard cylinder to cause the pipe to bend around the pipe bending contact surface of the die. Force is then released on the outboard cylinder, inboard cylinder, and the cylinder for the pinup shoe. The pipe is then moved forward past the pinup shoe in selected increments. The pipe is bent after each incremental advance. A typical advanced distance could be one-half the diameter of the pipe. This is repeated until the desired angle is obtained.

After the bending force was applied, and the pipe bends somewhat, the force is removed and an angle measurement made at the opposite two ends of the pipe using a device which is commonly known as an Abney level.

A more recent method of determining the angle of bend in a pipe is described in U.S. Pat. No. 4,649,726, Trammell et al. In that described system a pair of pendulum type inclinometers are necessary with one mounted at each end of the pipe section. Each pendulum has a potentiometer keyed to the support shaft of the pendulum. As the pipe bends, the pendulum will seek a vertical position but will cause relative rotation of its support shaft with subsequent movement of the movable arm of the potentiometer. Thus, as the pipe is bent, the angle of the inclination transmitter at the bending changes, causes its pendulum inclination at its potentiometer voltage to change. That system has a relative voltage difference between the two transmitters. This is the information used in that system to find the angle of bend on the pipe.

SUMMARY OF THE INVENTION

This is a method and apparatus for determining the bend in a section of pipe which is being bent by a bending machine. It is especially useful for use where the bending machine is supported on a non-level surface. The pipe to be bent is normally supported in a conventional pipe bending machine which includes the afore-mentioned stiffback, the outboard cylinder, the pinup shoe, and die. The stiffback holds the pipe which is to be bent, and it is forced up against the die by the typical hydraulic means applying upward force to the stiffback.

When the pipe is placed in the stiffback in position where it is to be bent an initial signal $S_i$, representative of the angle of the unbent pipe with the horizontal, is determined. This angle $S_i$ is critical to know when the bending machine is on an unlevel surface. This determination $S_i$ is made at the end of the pipe extending outwardly from the pinup shoe, typically using a pendulum type detector.

The angle detector is secured to the pipe which extends out the pinup shoe. After the initial signal $S_i$ is obtained, this angle detector is calibrated so that instead of having an output reading $S_i$ (the true angle with respect to the horizontal or level), it will have a reading of zero. Before the pipe is bent, it will, of course, have a zero bend angle. This is represented on the readout of the angle determination meter as zero. Then as the pipe is subsequently bent additional increments, the detector will have a reading which is the true angle of bend of the pipe. As far as the detector is concerned, the pipe is in the horizontal position and the reading of the detector will then reflect the true angle of the bend.

Then upward force is applied to the stiffback to cause the pipe to be bent around the die. After the pipe has been forced upward against the die, the upward force of the stiffback portion is relieved, and the stiffback falls back some to its then relaxed position. This is the time that the second reading is taken of the outer end of the pipe to obtain an angle $S_b$, which is representative of the angle of the bend of the pipe. This is a straightforward system of determining the angle of bend of the pipe, and only one angle detector is needed.

The signal $S_b$ is normally an analog signal and is fed to an analog-to-digital converter to obtain a digital signal. The digital signal is fed to the radio unit to transmit to the radio receiver of the receiving unit. This signal is then converted to analog and displayed so the operator can know the true angle of bend of the pipe.

In a second embodiment, the initial reading $S_i$ is made, and then after force has been applied and the stiffback relieved, a second reading is taken of the outer end of the pipe to obtain an angle $S_n$ which is representative of the angle of the pipe with the horizontal. The initial angle $S_i$ is subtracted from the angle $S_n$, the latest measured angle, to obtain the angle of the bend of the pipe at that stage of bending.

Typically, a pendulum type detector is used to determine the initial signal $S_i$ and subsequent signals $S_n$. In this second embodiment, the signal is normally an analog signal, and is fed to an analog-to-digital converter to obtain a digital signal. This digital signal is fed to a radio unit to transmit it to a radio receiver in the receiving unit. The receiving unit includes the radio receiver, a storage for the value $S_i$, and a storage $S_n$ which will be the subsequent angle measured after the bend has been made in the pipe. A subtracting unit to subtract $S_i$ from $S_n$ is provided. These signals are obtained from the storage. The signal which is obtained is $S_B$ which is the true angle of the bend. A display unit is provided to illustrate the true bending angle. The pipe is advanced a selected increment, and the bending procedure is repeated. After the end of each bending step, the angle of the bend is determined. This proceeds until the desired angle of the bend has been obtained.

It is an important object of this invention to provide a system wherein only one transmitter is needed in determining the angle of the bend in this pipe bending process.

This and other objects will become apparent when taken in conjunction with the description and drawings, in which:

BRIEF DESCRIPTION OF THE DRAWINGS

FIG. 8 illustrates the relationship after calibration in accordance with this invention of the read-out of the detector showing the actual bend angle and the true detected angle with respect to the horizontal.

DETAILED DESCRIPTION OF THE PREFERRED EMBODIMENT

Figure 1:
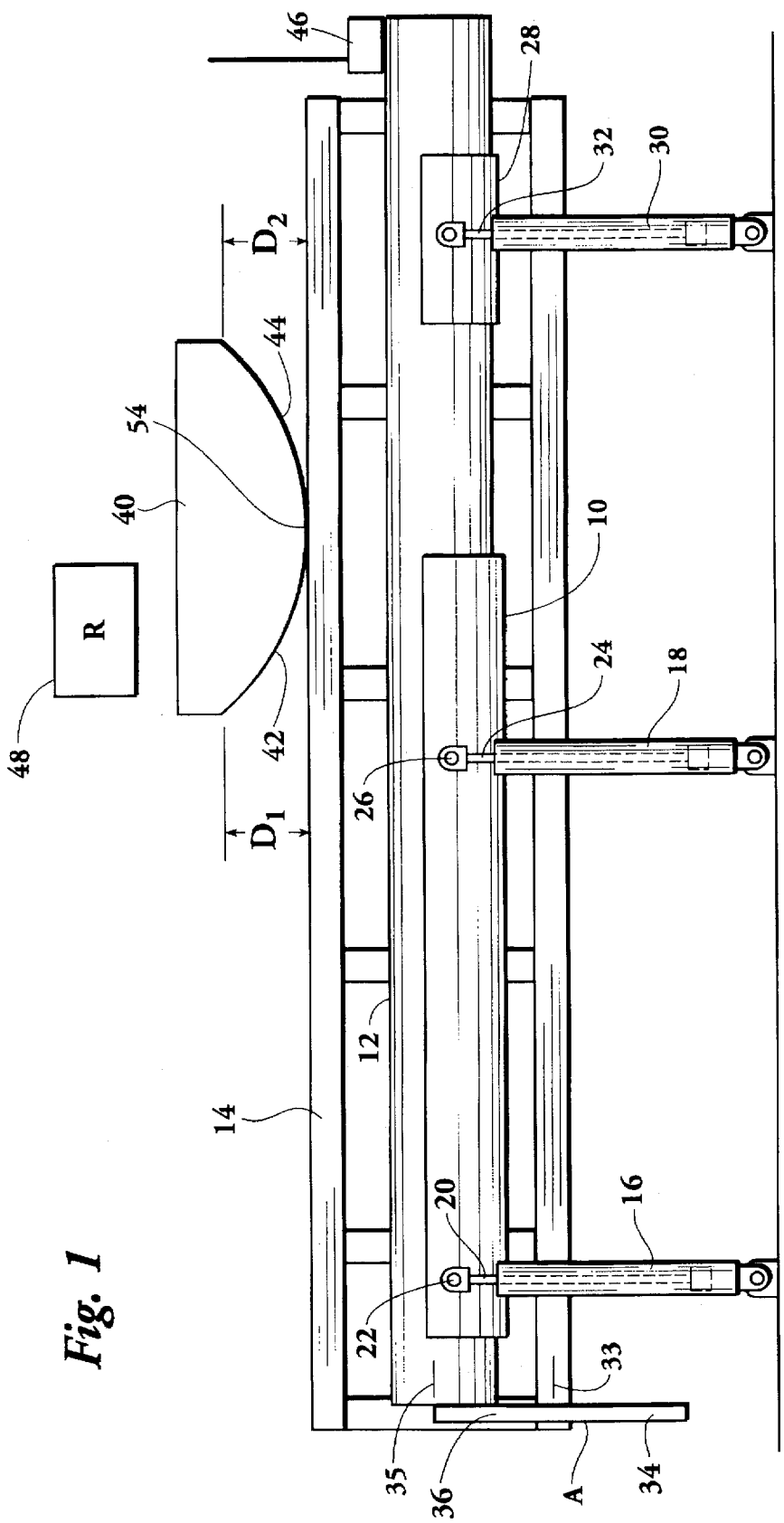
FIG. 1 is a schematic view of a pipe bending apparatus which includes a stiffback, the pipe to be bent, and the positioning of the novel system of angle detector, transmitter, and receiver.

Attention is directed to FIG. 1 which shows the basic bending components of a bending machine for bending pipe. It includes a stiffback 10 for holding a section of pipe 12. The stiffback is supported from a frame 14 by an outboard lifting cylinder 16 and an inboard lifting cylinder 18. The stiffback is a semi-circular trough-like pipe and is of a size to receive the pipe 12. In other words, the radius of the curvature of the stiffback 10 is normally about the same as the radius of the pipe 12. Cylinder 16 has a piston rod 20 which is connected to the stiffback 10 at point 22. Likewise, inboard lifting cylinder 18 has a piston rod 24 which connects to the stiffback 10 at 26.

The right end of the pipe 12 is supported by a support means 28 which fits to cradle the right end of the pipe. It can include a cylinder 30 having a piston rod 32 which connects to the support cradle 28. The housing of the cylinders 16, 18, and 30 are supported from frame 14 which can be supported from the ground in any well-known manner.

Outboard cylinder 16 has an indicator 34 which can be supported from stiffback 12 by member 35 and moves up and down with respect to frame 14. A reference line 33 is provided on frame 14. This is used to give reference to the stiffback with respect to housing cylinder 16. I have just described the support portion of the bending machine for the pipe 12.

There is a die 40 which is supported from a frame above the pipe 12. This frame has a forward curvature edge 42 which is adapted to contact the upper portion of pipe 12. The right-hand side of die 40 is also provided with a curved portion 44 similar to 42. The die 40 is fixed with respect to the frame 14. This stiffback, pinup shoe, die, means for supporting them and the reference means may be conventional.

I will now describe the positioning of the transmitter and receiver of my invention.

A transmitter 46 is provided on the right-hand end of the pipe, and a receiver 48 is secured from frame 14 at a position by structure not shown where it is convenient for the operator. The transmitter and receiver may be secured by magnets. Transmitter 46 detects and reads the angle of pipe 12 with respect to horizontal position and, as will be explained in more detail, sends out signals to the receiver.

When it is desired to bend a joint of pipe 12, the bending machine is selected to have a stiffback 10, a support trailer pinup 28, and a die 40 to accommodate the particular size pipe to be bent. The pipe 12 is placed in as shown in FIG. 1. The outboard cylinder 16 and the inboard cylinder 18 are actuated to bring the top of the pipe 12 into contact with the bottom 54 of die 40. When contact is made, the lifting of the cylinders is stopped, and the cylinder 30 is activated to bring the pinup shoe in contact with the right end of the pipe 12. The lifting of the cylinders 16 and 18 and the tightening of the pinup shoe 28 is of an amount to obtain a relationship with the die 40 so that $D_1$ and $D_2$, as shown in the drawing, are equal. The die is symmetrical in cross-section. During the reading point A is noted on indicator 34 as a reference point.

Figure 7:
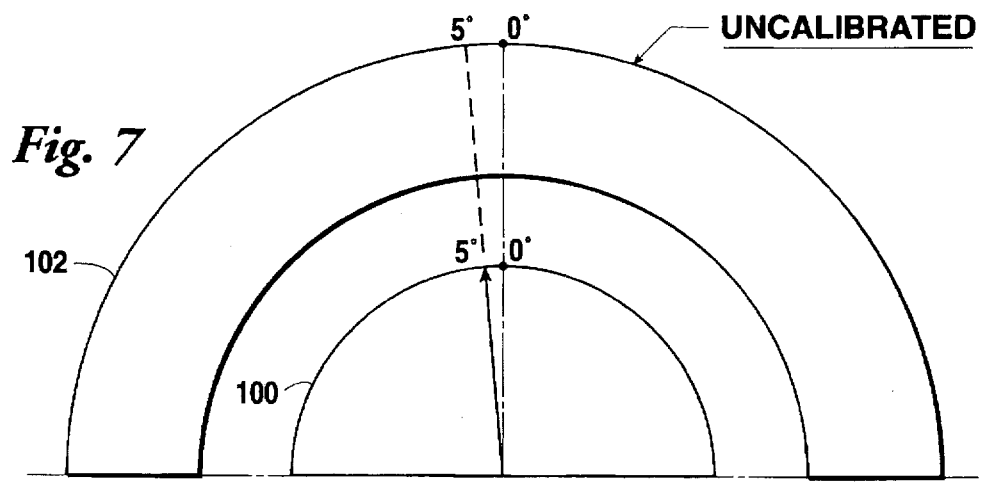
FIGS. 7 and 8 illustrate the calibration of the angle detector, with FIG. 7 showing the relationship of the true detected angle with respect to the readout of the angle detector before calibration, i.e. each is identical to the other.
Figure 8:
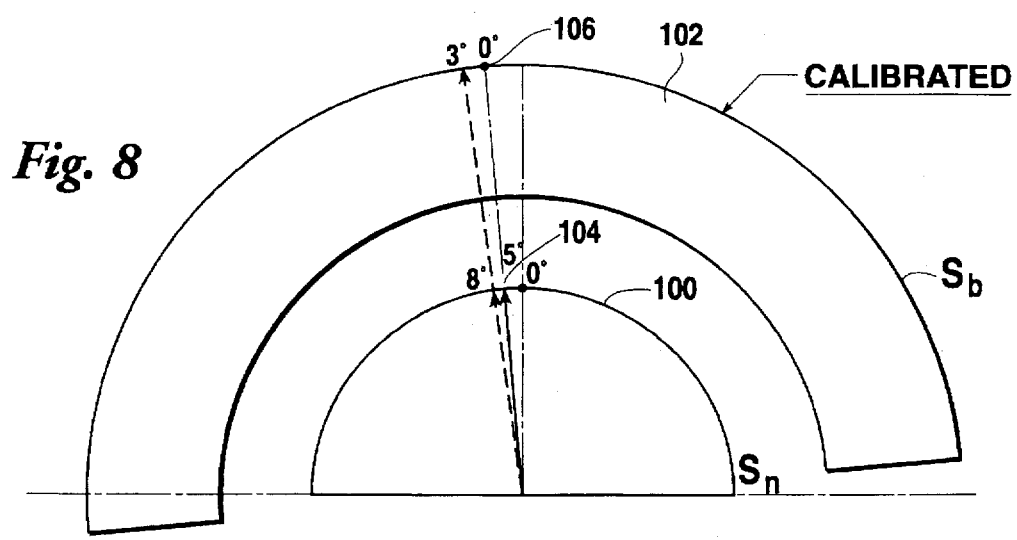

I will now describe the preferred embodiment for determining the true angle of bend of a section of pipe. Transmitter unit 46 includes typically a pendulum type detector to determine the angle of the pipe with respect to the horizontal. The transmitter unit 46 is spaced on the right end of the pipe beyond the pinup wedge. An initial reading is made before the pipe is bent. Typically the transmitter unit contains a pendulum type detector which determines the signal $S_i$ which is the signal representative of the angle of the pipe, that is the axis of the pipe with respect to the horizontal. In FIG. 7, the curve 100 shows the angle that the pipe makes with the horizontal. Curve 102 represents the readout from the detector. In FIG. 7 it shows that the detector is "uncalibrated" and the readings with the curve 100 and 102 are identical. In the example shown in FIG. 7 the angle the pipe makes with the horizontal is five degrees (5°). Five degrees is also represented on the curve 102. Inasmuch as the pipe has not been bent yet, it actually has a zero degree angle of bend, and the reading on the readout detector curve 102 is not correct as it shows 5°. Therefore, I make a calibration of the level detector as illustrated in FIG. 8. I calibrate the detector so that when the detector detects a 5° angle, shown on curve 100 at point 104, the readout from the calibrated detector shows zero degrees on curve 102 at point 106, which is the true angle of bend. I know this because the pipe has not been bent yet. As used herein, the term "calibrated detector" is used to mean a detector which has been calibrated to have a readout to account for inclined surfaces upon which the pipe bending machine is supported. Essentially all inclinometers are made with provisions for calibrations. I calibrate in a very novel manner to obtain the true angle of bend of the pipe and with only one angle detector. This has not heretofore been known.

Figure 2:
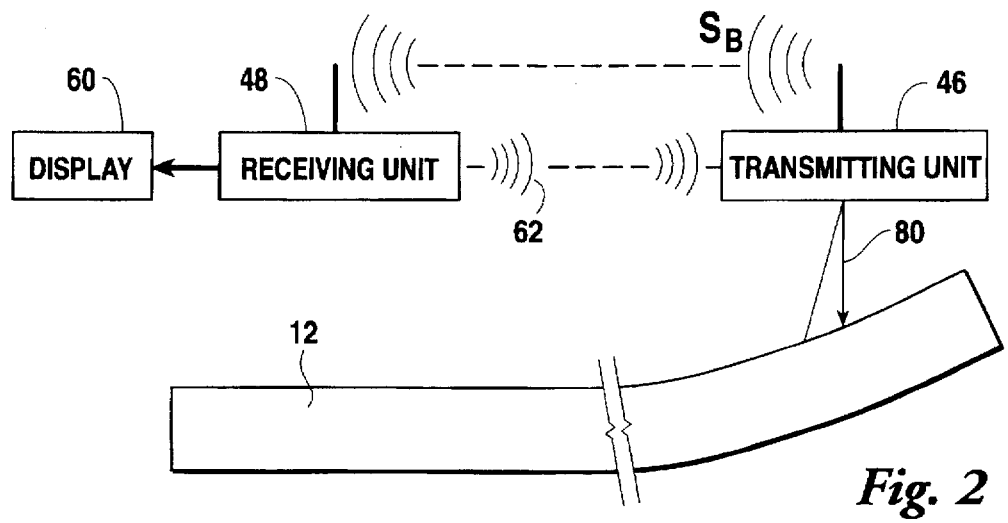
FIG. 2 illustrates schematically the pipe of FIG. 1 after it has been bent.
Figure 4:
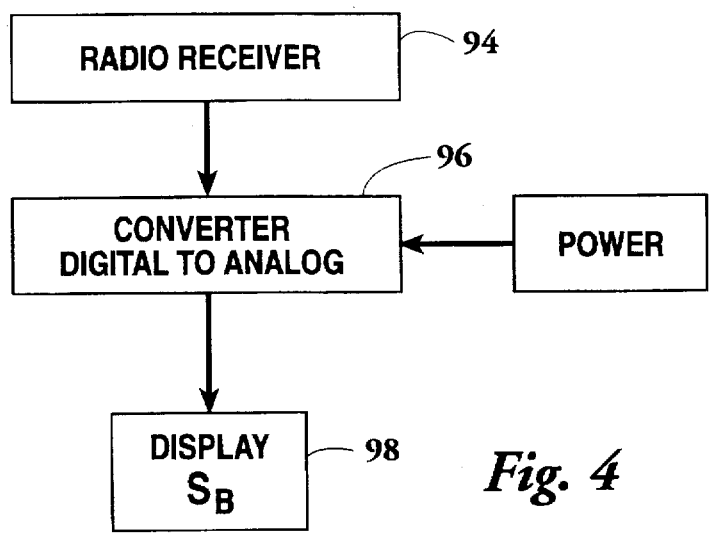
FIG. 4 illustrates in block diagram form the display of the signal transmitted from the apparatus in FIG. 5.

At this time after the pipe has an incremental bend, a reading is taken at the level detector in transmitter 46 of the angle (in degrees) of the right end portion of the pipe with respect to the level. The pendulum in the example shown in FIG. 8 is at an angle of 8°, but the readout on the calibrated detector unit is 3°. This is because the unit has been calibrated so that with the pendulum actually makes a 5° angle that the readout will read zero degrees. Thus, when the pendulum reads 8°, then the readout is 3°. The angle at 5° is merely illustrative and is $S_i$ which is the angle the pipe makes with the horizontal. This 3° is a true bend measurement of the pipe which is the information required. The true reading $S_B$ is 3°, is preferably converted to digital form, and is transmitted in a known manner from transmitter unit 46 to receiving unit 46 which includes a radio receiver 94 as shown in FIG. 4. The received signal is conveyed to digitalto-analog converter and then to display 98. Any desired display may be used. This is a novel and straightforward way to determine the bend in the pipe. In a sense the angle $S_i$ (the angle the unbent pipe makes with the horizontal) is contained in the detector as the amount of calibration change made. The difference between the initial reading $S_i$ and the output signal $S_n$ from the detector is the true angle of bend $S_B$ of the pipe. The calibration performs this function Attention is next directed to FIG. 2 which shows in isolation the pipe 12 being bent. Whenever the operator desires to have a bend reading taken, he sends a signal from receiver unit 48 over radio signal 62 to unit 46. When the unit 46 receives this signal, it takes a reading by operation of an inclinometer or angle detector 80 which preferably includes a pendulum with a potentiometer keyed to the support shaft of the pendulum. A typical angle detector is commercially available from COMUS-Int. of New Jersey and designated PD-3052-10K The bending procedure may now begin. Outboard cylinder 16 and inboard cylinder 18 are then activated to push the pipe 12, up and about the bending surface 42 of the die 40. This bending procedure continues until the top of pipe 12 takes on the angle of the bending surface 42. Then the outboard cylinder 16 and inboard cylinder 18 are relaxed, and the pipe is relieved and will, because of its elasticity, back away from the surface 42 a small amount and the angle reaching as described above is made again.

The pipe is then moved forward a selected distance which is quite normally one-half of the diameter of the pipe. After the pipe has been moved forward, the outboard cylinder and the inboard cylinder are operated to contact the pipe and move the pipe upwardly until the point A of indicator 34 is the same as it was before the first bending. Then the support trailer pinup shoe 28 is tightened up against the pipe before the next step takes place.

The bending procedure is then repeated, another reading of the curvature of the pipe is taken, the signal $S_B$ is obtained from the calibrated inclinometer or detector, and reads out the correct angle of bend $S_B$ of the pipe. Signal $S_B$ is then transmitted to receiving unit 48 where it is displayed in display 98 as described above. This procedure is repeated until the desired bending procedure is completed.

Figure 3:
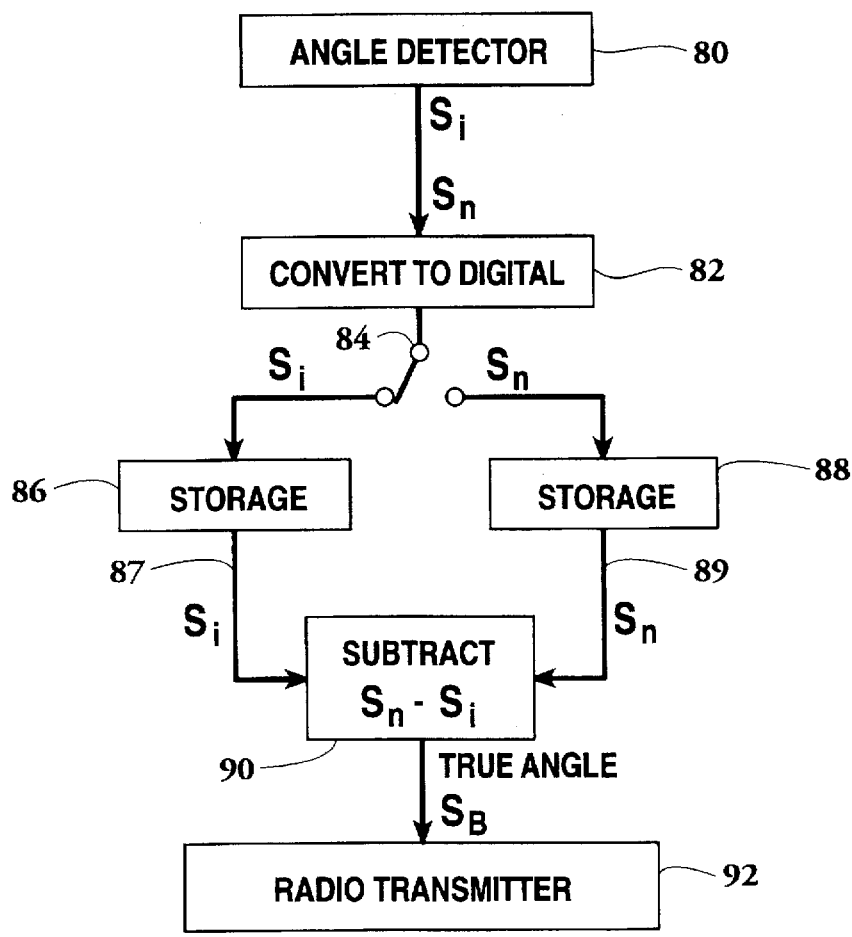
FIG. 3 illustrates in block diagram form a modification of the invention in which the storing of the initial signal, subsequent signal and operations on the signals is done at the transmitter site.

Attention is next directed to FIGS. 3 and 4 which show another embodiment and manner in which the signals $S_i$ and $S_n$ are obtained and are operated upon in a slightly different manner to obtain signal $S_B$. Before the pipe is initially bent a reading signal $S_i$ is taken at transmitter 48 of the angle (in degrees) of the right end portion of pipe with respect to the level. In this arrangement the true angle of bend $S_B$ is obtained by subtracting $S_i$ from $S_n$ in the transmitting unit using conventional computer technology. Uncalibrated angle detector 80 (which has not been calibrated to have its readout altered to compensate for unlevel ground), detects the angle of the pipe, i.e. its axis, with respect to the horizontal position. In this embodiment, the signal is conveyed to digital converter 82 which then has a digital output $S_i$ which is directed to switch 84. The initial signal is directed to storage 86. Subsequent signal $S_n$ is directed through switch 84 to storage 88. Storage units 86 and 88 can be any memory chip or other means (and may be in one unit) having the ability to store signals $S_i$ and $S_n$ and retrieve them individually. The outputs of storage 86 and 88 are connected through lines 87 and 89 to a subtract unit 90 which performs the function of subtracting $S_i$ from $S_n$. The output is $S_B$ which is the angle of bend of the pipe. This is fed to a radio transmitter 92. It is then conveyed by radio waves to the receiver 94 of FIG. 4. Converter 66 converts the digital to an analog signal and displays it on display 98 to show the true angle $S_B$.

Figure 6:
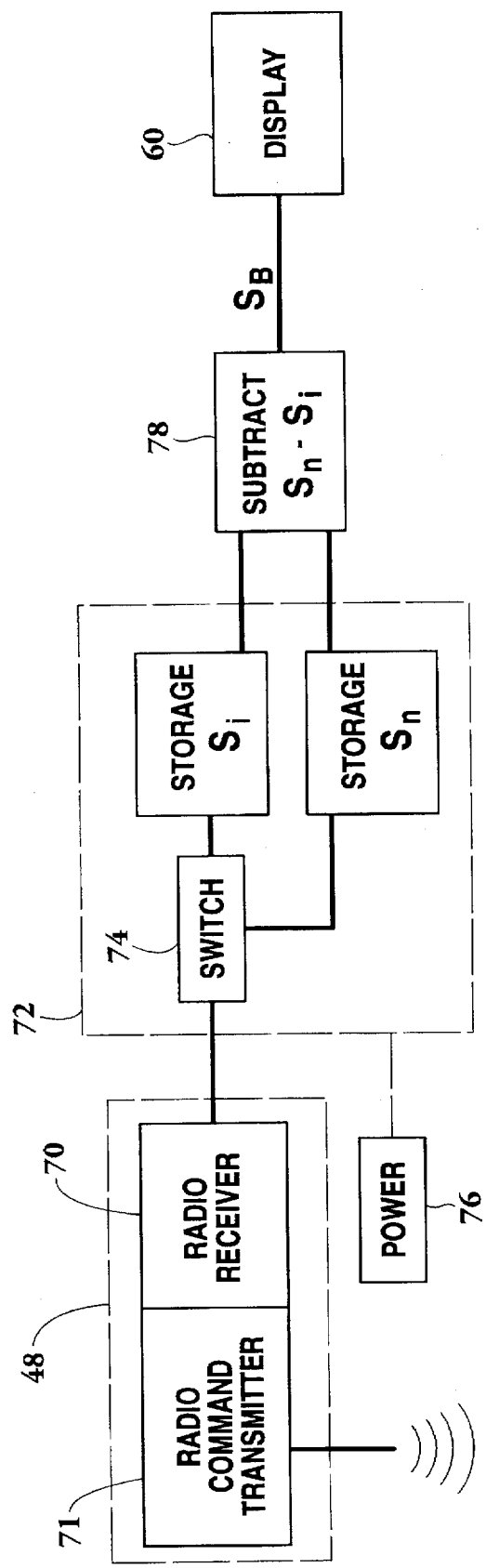
FIG. 6 illustrates a receiver and block diagrams of components for processing the detected angles to obtain the true angle of bend.
Figure 5:
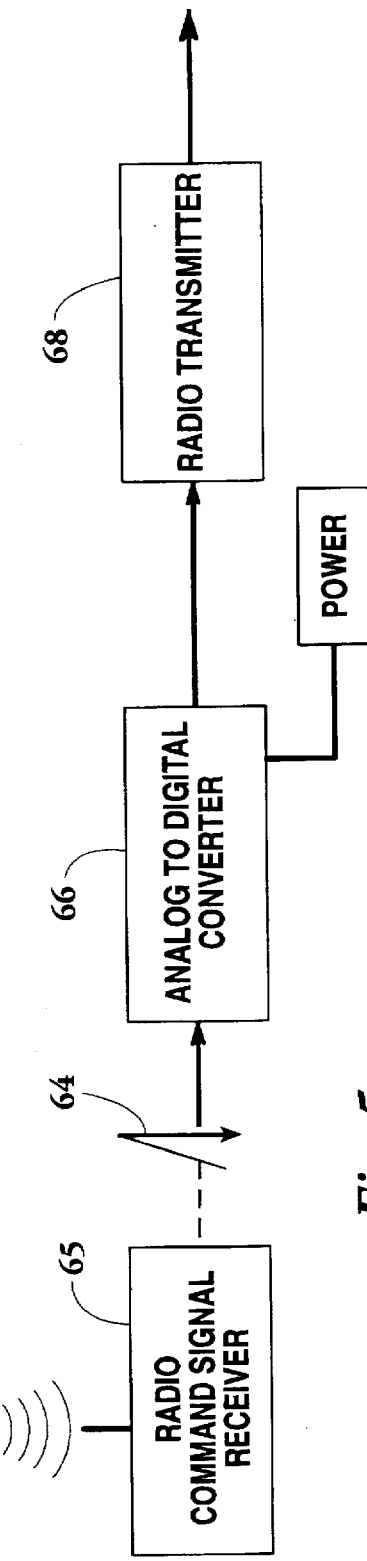
FIG. 5 illustrates apparatus for conversion of the detected angle signal to a digital converter and transmitter.

A still further embodiment of the invention is shown in FIGS. 5 and 6. The reading is taken by a well-known method using a pendulum and potentiometer as indicated at 64 and generates an analog signal which is conducted to digital converter 66. The device 64 can be similar to detector 80. The digital signal is then transmitted by radio transmitter 68. This transmitted radio active signal is received by radio receiving unit 70 in receiving unit 48. This receiving unit is shown in FIG. 6. This received signal, $S_i$ or $S_n$, is then fed to a storage unit 72 which contains internal storage to store signal $S_i$ and signal $S_n$ so that each one can be retrieved independent of the other. The switching mechanism 74 is used merely to indicate the storing of signal $S_i$ and signal $S_n$ in a recoverable manner. Such storage and recovery are well-known techniques.

A subtraction unit 78 receives signal $S_i$ and $S_n$ from storage unit 72 and performs the mathematical operation of subtracting $S_i$ from $S_n$ to obtain the signal $S_b$ which is the true bend of the angle of the pipe. This signal $S_b$ is then displayed on display 60.

The angle measurement and transmitter unit of FIG. 5 is activated by a radio signal from radio command transmitter 71 of FIG. 6, which sends an initiation signal to radio command signal receiver 65 of FIG. 6 to cause inclinometer 64 to take a reading, convert to digital in unit 66, and transmit the signal by transmitter 68 to radio receiver 70 of FIG. 6. A similar radio command can be used in relation to the devices of FIGS. 3 and 4. Any qualified electrical engineer can readily connect the components shown in FIGS. 5 and 6 to obtain the desired and stated results.

While the invention has been described with a certain degree of particularity, it is manifest that many changes may be made in the details of construction without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A method of determining the true angle of bend in a joint of pipe produced by operation of a bending machine in which the pipe has a first portion and a second portion, which comprises:

a.) attaching an angle detector to the second portion of pipe which is capable of determining the angle the pipe has with relation to the horizontal to obtain a first output signal $S_i$;

b.) calibrating the angle detector such that its output is zero before the pipe is bent;

c.) bending said pipe;

d.) then obtaining a second output signal $S_B$ from the calibrated detector which is the true angle of the bend in the pipe.

2. A method of determining the true angle of bend in a pipe produced by operation of a bending machine in which the pipe has a first section and a second section which comprises:

a.) measuring at only one location and in said section an angle which the pipe in its initial position in the bending machine has in relation to the horizontal to obtain a signal $S_i$;

b.) storing signal $S_i$;

c.) bending said pipe;

d.) obtaining a second signal indicative of the angle of the second section of the pipe, in relation to the horizontal to obtain a signal $S_n$;

e.) subtracting signal $S_i$ from signal $S_n$ to get the true angle of bend $S_B$ in the pipe.

3. A method as defined in claim 2 including the step of; displaying said signal $S_B$.

4. A method as defined in claim 2 in which after said initial bend has been made;

g.) moving the pipe with respect to the bending machine;

h.) additionally bending the pipe to a second bending position;

i.) obtaining a second signal $S_n$, which is the angle of the second section of pipe in relation to the horizontal;

j.) subtracting $S_i$, from second signal $S_n$ to get the value of the true bend $S_B$ in the pipe after said second bending operation;

k.) displaying said $S_B$;

l.) repeating steps (g), (h), (i), (j), and (k) until the desired angle $S_B$ is obtained for the stage of operations.

5. A method as defined in claim 4 including the step of;

m) moving the pipe a selected distance longitudinally in the bending machine, bending the pipe a second time, and measuring the true angle of bend and continuing to move the pipe a selected distance in steps and bending the pipe after each step until the desired bend has been obtained.

6. A method of determining the bend in a section of pipe which comprises:

holding the pipe in its initial position; before the pipe is bent, determining the initial signal $S_i$ representative of the angle of pipe with the horizontal while the pipe is in such initial position;

exerting a first transverse upward force against a first portion of the pipe;

after exerting such first force, measuring at a second portion of the pipe the angle of the pipe with respect to the horizontal to obtain $S_n$ which is the signal identifying the angle the pipe makes with the horizontal after said first force is applied;

subtracting $S_i$ from $S_n$ to obtain the true angle of bend.

7. A method as defined in claim 6 including displaying the obtained angle of the bend.

8. An apparatus for determining the true angle $S_B$ of bend in a pipe obtained by operation of a bending machine in which the pipe has a first portion and a second portion which comprises;

one and only one detector in the apparatus and it is placed on said second portion for determining the angle which the pipe in its first position in said bending machine has in relation to the horizontal in order to obtain an initial signal $S_i$ before the pipe is bent and for determining subsequent signals $S_n$ which are measures of angle of pipe in relation to the horizontal after it has been bent from its initial position;

means to store $S_i$;

means to subtract $S_1$ from $S_n$ to obtain a true bend angle $S_B$;

means to display signal $S_B$.

9. Apparatus for determine the true angle of bend $S_B$ in a pipe obtained by operation of a bending machine in which the pipe has a first portion and a second portion which comprises:

a transmitter unit supported by said pipe including an inclinometer for determining an angle of the second portion of the pipe with respect to the horizontal to obtain an initial signal $S_i$ before the pipe is bent and subsequent signals $S_n$ of the angle of bend of pipe at the second portion with respect to the horizontal for subsequent incremental bending;

means to subtract $S_i$ from $S_n$ to obtain the angle $S_B$ of bend in the pipe;

means to display $S_B$.

10. An apparatus as defined in claim 8 including a receiving unit and in which the means to store $S_i$ and $S_n$ is in a unit removed from said transmitting unit and also including means to transmit by radio waves $S_i$ and $S_n$ to the receiving unit.

* * * * *